Patented Aug. 24, 1937

2,091,178

UNITED STATES PATENT OFFICE 2,091,178

STABILIZING HYDROGEN PEROXIDE SOLUTIONS WITH PYROPHOSPHORIC ACID PLUS A TIN COMPOUND

Harvey N. Gilbert and Joseph S. Reichert, Niagara Falls, N. Y., assignors to E. I. du Pont de Nemours & Company, Wilmington, Del., a corporation of Delaware No Drawing. Original application December 1, 1932, Serial No. 645,324. Divided and this application December 24, 1934, Serial No. 759,044

5 Claims. (Cl. 23—251)

This invention relates to the stabilization of hydrogen peroxide solutions and more specifically to the stabilization of the high concentration acid hydrogen peroxide solutions as commonly transported. This application is a division of our copending application S. No. 645,324, now Patent 2,004,809 dated June 11, 1935.

In general it should be stated that hydrogen peroxide solutions are of two kinds. The first are those which are of a relatively high concentration, i. e. about 10 volume concentration or higher, and which are kept in acid condition in order to have a maximum stability. Secondly the more dilute, alkaline hydrogen peroxide solutions as are commonly used in bleaching, i. e. about one volume concentration.

For bleaching purposes it has been found more satisfactory to operate with solutions which are of an alkaline nature, since the alkalies assist in removing various impurities. Such alkaline solutions, however, are more unstable than the acid solutions and hence, it has been common practice to add various stabilizers to the alkaline solution to prevent undue loss of peroxide. In this case, however, we are dealing with the first type of peroxide solutions.

In the production of acidic hydrogen peroxide solutions it has been found usually impractical to completely remove the last traces of the impurities which accelerate the decomposition of peroxide. It has, therefore, been desirable to add stabilizers to these solutions in order to retard the decomposition of peroxide by these traces of impurities or particles of dirt or other active decomposition catalysts which may be introduced into the solution in handling or use.

Many organic stabilizers are very effective in retarding the decomposition of impure acidic hydrogen peroxide and their use adds very little to the peroxide production costs. However, organic stabilizers have undesirable properties. Materials such as salicyclic acid form colored solutions if there are traces of iron salts present in the bleach bath in which the peroxide is subsequently used or the peroxide solution itself may become colored due to the oxidation of these organic materials such as acetanilide. Furthermore, organic stabilizers are decomposed if the concentrated peroxide solutions are heated and thereby lose their stabilizing properties.

Inorganic materials are in general not as effective as organic materials in retarding the decomposition of peroxide solutions. Furthermore there are only a few inorganic compounds which are efficient stabilizers for peroxide solutions; in fact many inorganic materials are active catalysts for the decomposition of peroxides, as for example iron and copper salts. A few inorganic stabilizers have advantages over organic stabilizers including the following: (1) colorless (2) odorless (3) better stabilizing action at high temperatures (4) less decrease in stabilizing effectiveness for long storage periods (9–12 months) at room temperature.

The object of this invention is to provide a stabilizer without the undersirable properties for acidified hydrogen peroxide solutions and more particularly for hydrogen peroxide solutions of a concentration as ordinarily shipped in commerce, i. e. about 10 volume concentration or higher, and to provide thereby high concentration peroxide solutions which can be shipped and stored for relatively long periods without serious losses. A further object is to provide a stabilizer which is effective at both ordinary and high temperatures.

We have discovered that a compound made by heating orthophosphoric acid and stannous chloride together is an excellent stabilizer for concentrated acid hydrogen peroxide solutions. Solutions of peroxide stabilized with this compound are colorless, odorless and show a marked stability at room temperature and also at a temperature of 100° C. By stabilizing hydrogen peroxide solutions with this tin-pyrophosphate compound we obtain the stabilizing effect of the tin compounds and the pyrophosphate ion.

In carrying out the present invention a small amount of this pyrophosphoric acid-tin compound is added to hydrogen peroxide solutions of various concentrations. For the sake of simplicity in the following examples, the amount of the stabilizer added is expressed in a contracted form, for example of 0.2 g. $H_4P_2O_7$+5 mg. Sn/liter. This means that we have added thereto an amount of a stabilizer prepared by heating tin chloride and orthophosphoric acid such that an equivalent of 0.2 gram of pyrophosphoric acid and 5 milligrams of tin as a tin compound have been added to a liter of the peroxide solution. Such an expression is made necessary because the exact composition of this tin-pyrophosphate stabilizer is not known and the proportions of tin and pyrophosphate can be varied.

*Example I*

To portions of freshly prepared commercial hydrogen peroxide solution of 100 volume strength was added 0.2 g. $H_4P_2O_7$+5 mg. Sn/liter of stabilizer. The pH of the unstabilized sample was about 3.5, and the pH of the stabilized samples was about 2.0. All samples were maintained at a constant temperature of 32° C. and the rate of oxygen evolution was measured. From these measurements the losses in volume concentration equivalent to the loss over a period of 30 days were calculated. The results of this experiment appear in the following table:

| Sample | Unstabilized 100 volume $H_2O_2$—Loss in volume concentration equivalent to 30 days storage at 32° C. | 100 volume $H_2O_2$ stabilized with 0.2 g. $H_4P_2O_7$+5 mg. Sn/liter. Volume concentration loss equivalent to 30 days storage at 32° C. |
|---|---|---|
| 1 | 5.7 | 0.21 |
| 2 | 6.8 | 0.25 |

These results show that pyrophosphoric-tin stabilizer is a very effective stabilizer at ordinary temperatures. The losses of this stabilized peroxide as compared with the losses in the same peroxide unstabilized are in the ratio of approximately 1:30. In other words, addition of this stabilizer to the unstabilized peroxide increases its stability almost 30 times.

*Example II*

To portions of freshly prepared hydrogen peroxide of 100 volume strength and normal commercial acidity was added pyrophosphate-tin stabilizer in such quantity that the amount of pyrophosphate remained constant and the amount of tin present varied from 0 to 0.2 g. These samples were heated at 100° C. for 16 hours and the loss determined. The following results were obtained.

| Sample | 100 vol. $H_2O_2$ with | Percent loss when heated at 100° C. for 16 hrs. |
|---|---|---|
| 1 | 1.5 g. $H_4P_2O_7$+0.2 g. Sn/liter | 1.4 |
| 2 | 1.5 g. $H_4P_2O_7$+0.01 g. Sn/liter | 5.6 |
| 3 | 1.5 g. $H_4P_2O_7$+0.002 g. Sn/liter | 9.1 |
| 4 | 1.5 g. $H_4P_2O_7$+no Sn/liter | 42.1 |

We have found that small amounts of this stabilizer containing from 0.2 gram to 0.002 gram Sn/liter increased the stability of the peroxide from 4½ to more than 20 times depending upon the amount of tin present as compared with the same peroxide stabilized with only pyrophosphoric acid. By increasing the amount of tin present from 0.002 g. to 0.2 g. per liter we were able, as shown in Example II, to decrease the volume loss of the peroxide solution when heated for 16 hours at 100° C. from 9.1 vol. to 1.4 vol.

We prefer to use about 0.2 gram of pyrophosphoric acid+0.005 g. of tin per liter for we have found that this gives sufficient stabilization for commercial uses. On the other hand, we have used as high as 1.5 g. $H_4P_2O_7$+0.2 g. Sn/liter and have obtained the same desirable results.

*Example III*

To portions of freshly prepared commercial hydrogen peroxide of 162 and 174 volume strength was added pyrophosphate-tin stabilizer equivalent to 0.5 g. $H_4P_2O_7$+5 mg. Sn/liter. The rate of decomposition at 32° C. was determined for samples of stabilized and unstabilized peroxide and the decomposition equivalent to storage at 32° C. for 30 days was computed. Other samples were stored at 100° C. for 16 hours and the decomposition losses were determined. The results of these experiments are given in the following table:

| Sample | Vol. concentration loss equivalent to 30 days storage at 32° C. | Per cent $H_2O_2$ loss on storage at 100° C. for 16 hrs. |
|---|---|---|
| 174 vol. $H_2O_2$ stabilized with 0.5 g. $H_4P_2O_7$+5 mg. Sn | 0.26 | 2.3 |
| 162 vol. $H_2O_2$ stabilized with 0.5 g. $H_4P_2O_7$+5 mg. Sn | 0.20 | 1.7 |
| 174 vol. $H_2O_2$ unstabilized | 2.0 | |
| 162 vol. $H_2O_2$ unstabilized | 1.9 | |

This experiment shows that the decomposition losses in 162 and 174 vol. hydrogen peroxide stabilized with our pyrophosphoric acid-tin stabilizer are only about one tenth of the loss occurring in unstabilized peroxide solutions of the same strength when stored at 32° C. for 30 days. This stabilizer is effective in keeping the decomposition losses low at 100° C.

*Example IV*

To determine the effect of the hydrogen ion concentration on the stability of peroxide solutions, we have taken 100 volume peroxide and stabilized it with 0.2 g. of $H_4P_2O_7$+5 mg. Sn/liter and have adjusted the pH of samples so stabilized at 2, 3, 4, 5, 6, and 6.5 respectively. All samples were maintained at a constant temperature of 32° C. and the rate of oxygen evolution was measured. From these measurements the losses in volume concentration equivalent to the loss over a period of 30 days were calculated. The results of this experiment are given in the following table:

| Sample | pH | 100 vol. $H_2O_2$ stabilized with 0.2 g. $H_4P_2O_7$+5 mg. Sn per liter — Volume concentration loss equivalent to 30 days storage at 32° C. |
|---|---|---|
| 1 | 2 | 0.4 |
| 2 | 3 | 0.3 |
| 3 | 4 | 0.25 |
| 4 | 5 | 0.35 |
| 5 | 6 | 2.25 |
| 6 | 6.5 | 4.75 |

We have found from this experiment that pyrophosphate-tin stabilizer is most effective in solutions in which the pH is maintained below 5. It should be noted that the losses in peroxide increase six or sevenfold when the pH of a solution is increased from 5 to 6. We prefer to keep the pH between 1.5 and 3.0 when using the stabilizer in concentrated peroxide solutions although it is readily apparent from the above example that the stabilizer has some effect even at a pH of as high as 6.5.

One method of preparing our pyrophosphoric acid-tin stabilizer is to dissolve 2.5 grams of $SnCl_2.2H_2O$ in 500 grams of 85% orthophosphoric acid ($H_3PO_4$) and heat gradually to 300° C. and then hold the temperature at 300° C. for 1 hour. In carrying out this experiment, it was observed that the temperature rises fast until water begins to boil off. After boiling starts, the temperature rises slowly while the water and HCl is boiling off. After the water has been boiled off, the temperature rises rapidly up to the maximum.

The temperature is maintained at the maximum for the desired heating period, that is until the loss in weight of $H_3PO_4+SnCl_2.2H_2O$ mixture is about 20%.

Other batches of stabilizer have been successfully prepared with a maximum temperature of 250° C. and 350° C. The time of heating at the maximum temperature has been varied from 0 to 4 hours. When a maximum temperature of above 300° C. is used care must be taken not to heat too fast or too long, otherwise the tin will be precipitated out. The results obtained from various batches of stabilizer are given in the following table:

| Sample | Heating | | Percent loss in weight | Weight $H_3PO_4$ | Weight $SnCl_2.2H_2O$ | Vol. conc. loss equivalent to storage at 32° C. for 30 days | Percent $H_2O_2$ loss at 100° C. for 16 hrs. |
|---|---|---|---|---|---|---|---|
| | ° C. | Hr. | | | | | |
| | | | Percent | Grams | Grams | | |
| 1 | 250 | 1 | 15.8 | 500 | 2.5 | 1.4 | 6.4 |
| 2 | 250 | 4 | 17.8 | 500 | 2.5 | 0.7 | 5.7 |
| 3 | 300 | 1 | 20.0 | 500 | 2.5 | 0.9 | 6.1 |
| 4 | 300 | 2 | 20.6 | 500 | 2.5 | 0.8 | 6.5 |
| 5 | 350 | 0 | 20.0 | 500 | 2.5 | 1.1 | 6.6 |

It is readily apparent from the results found that the pyrophosphate-tin stabilizer can be prepared under a wide range of temperature and heating conditions. We prefer to prepare our stabilizer according to the method of Example 3 above.

This stabilizer is also satisfactory for retarding the decomposition of acid-peroxide solutions of higher and also of lower peroxide concentrations than that of the specific examples shown herein.

We claim:

1. A process for preparing a stabilizer for peroxygen compounds in solution which comprises heating 85% orthophosphoric acid and stannous chloride in the relative proportions of 500 grams of said acid to 2.5 grams of stannous chloride as $SnCl_2.2H_2O$ for a period of time sufficiently long to result in dehydration of orthophosphoric acid to pyrophosphoric acid and for a loss in the weight of the product of substantially 20% to occur.

2. A process for preparing a stabilizer for peroxygen compounds in solution which comprises heating 85% orthophosphoric acid and stannous chloride in the relative proportions of 500 grams of said acid to 2.5 grams of stannous chloride as $SnCl_2.2H_2O$ to a temperature within the range 250 to 350° C. and for a period of time sufficient to result in dehydration of said orthophosphoric acid to pyrophosphoric acid and for a loss in the weight of the product of substantially 20% to occur.

3. A process for preparaing a stabilizer for peroxygen compounds in solution which comprises heating 85% orthophosphoric acid and stannous chloride in the relative proportions of 500 grams of said acid and 2.5 grams of stannous chloride as $SnCl_2.2H_2O$ to a temperature within the range 250 to 350° C. and for a period of time ranging up to 4 hours which is sufficient to result in dehydration of said orthophosphoric acid to pyrophosphoric acid and for a loss in the weight of the product of substantially 20% to occur.

4. A process for preparing a stabilizer for peroxygen compounds in solution which comprises heating 85% orthophosphoric acid and stannous chloride in the relative proportions of 500 grams of said acid to 2.5 grams of stannous chloride as $SnCl_2.2H_2O$ to a temperature of substantially 300° C. and for a period of time up to about 4 hours which is sufficient to result in dehydration of said orthophosphoric acid to pyrophosphoric acid and to bring about a loss in the weight of the product of substantially 20%.

5. A stabilizer for solutions of hydrogen peroxide which comprises the product prepared by heating 85% orthophosphoric acid and stannous chloride in the relative proportions of 500 grams of said acid to 2.5 grams of stannous chloride to a temperature of 250 to 350° C. and for a period of time sufficient to result in dehydration of said orthophosphoric acid to pyrophosphoric acid and for a loss in the weight of the product of substantially 20% to occur.

HARVEY N. GILBERT.
JOSEPH S. REICHERT.